(12) United States Patent
Bartosik

(10) Patent No.: US 7,305,228 B2
(45) Date of Patent: Dec. 4, 2007

(54) METHOD OF PROVIDING AN ACCOUNT INFORMATION AND METHOD OF AND DEVICE FOR TRANSCRIBING OF DICTATIONS

(75) Inventor: Heinrich Bartosik, Vienna (AT)

(73) Assignee: Koninklijke Philips Electronics N.V., Eindhoven (NL)

(*) Notice: Subject to any disclaimer, the term of this patent is extended or adjusted under 35 U.S.C. 154(b) by 580 days.

(21) Appl. No.: 10/186,708

(22) Filed: Jul. 1, 2002

(65) Prior Publication Data

US 2003/0008633 A1 Jan. 9, 2003

(30) Foreign Application Priority Data

Jul. 5, 2001 (EP) .................................. 01890203

(51) Int. Cl.
*H04M 11/00* (2006.01)
*G10L 15/00* (2006.01)

(52) U.S. Cl. ....................................... 455/406; 704/231

(58) Field of Classification Search ........ 455/405–410; 704/1–2, 8, 200, 201, 220, 231, 277, 278
See application file for complete search history.

(56) References Cited

U.S. PATENT DOCUMENTS

| 6,173,259 | B1 | 1/2001 | Bijl et al. ..................... 704/235 |
| 6,185,514 | B1 | 2/2001 | Skinner et al. .............. 702/188 |
| 6,802,015 | B2* | 10/2004 | Atkinson ..................... 713/322 |
| 6,820,055 | B2* | 11/2004 | Saindon et al. ............. 704/235 |
| 2004/0010539 | A1* | 1/2004 | Archbold ..................... 709/201 |

* cited by examiner

*Primary Examiner*—Duc M. Nguyen
*Assistant Examiner*—Michael Thier

(57) ABSTRACT

Method of providing account information for the prior use of a service facility with which, from input information, output information is obtained automatically for example in transcription of dictation, in which a dictation file is converted into a text file by means of an automatic voice recognition system, which account information is provided taking into account the detected effort of the manual processing of the output information obtained automatically.

14 Claims, 3 Drawing Sheets

METHOD OF PROVIDING AN ACCOUNT INFORMATION AND METHOD OF AND DEVICE FOR TRANSCRIBING OF DICTATIONS

The invention relates to a method of providing account information for the prior use of a service facility which processes computer software.

The invention also relates to a device for transcribing dictations with voice recognition means for automatic conversion of a supplied dictated file into a text file and with text processing means for manual processing of the text file and with calculating means for producing account information for the transcription performed.

Automatic voice recognition systems are used more and more frequently for automatic transcription of dictation. The results of the transcription depend in quality on the complexity of the voice recognition system concerned, which includes the storing of "dictionaries" and voice patterns in libraries in order to particularly recognize and efficiently analyze the voice of certain dictating persons. The "dictionaries" are usually subdivided by fields such as, for example, medical fields, technical fields, legal fields and commercial fields. In view of the higher quality from greater complexity of the voice recognition software available and data storage for the voice recognition, transcription service companies have arisen which can use sophisticated voice recognition systems and transcribe dictations into text for various customers and invoice their transcription services accordingly. A corresponding dictation transcription system is described for example in patent document U.S. Pat. No. 6,173,259 A. Here dictations are recognized using voice recognition software and converted into text files which can be processed manually by persons in order to correct faults in the text file arisen on recognition of the dictations and caused by faulty dictation, e.g. improve incorrect words, insert missing words or delete surplus words. If the text quality of a text file in conversion from the dictation file is poor, it can also be decided to perform the transcription without the automatic voice recognition system i.e. to enter the text manually from the dictation. Where applicable, if the client so desires, the transcription can in this case be performed by the customer himself and in a corresponding manner it can also be provided that the transcribed text file can be revised or corrected by the customer himself. These transcriptions or revisions by the customer himself can be provided in those cases where the production of a correct text is difficult for any reason and queries to the author with regard to individual passages are no longer appropriate. Apart from any background noise during dictation, errors in dictation or unsatisfactory quality in dictation by an inexperienced person, another reason can be the difficulty of understanding the text, namely the use of relatively unknown profession-specific terms which are not contained in the stored libraries.

Transcriptions of dictations performed by commercial service companies are usually accompanied by invoices, the amount of which can differ depending on the amount of text i.e. the number of lines transcribed, and also the field concerned—medicine, engineering etc., where applicable with sub-divisions. The dictating persons (referred to below as the authors), however, differ in their accuracy during dictation and these differences in the "off-line transcriptions" are naturally reflected in the transcription complexity and the quality of the transcribed text. If someone from the clerical staff dictates a text directly i.e. "on-line", any errors can be detected and corrected immediately. If, however, dictation is spoken onto a memory device, for example in the case of a portable dictaphone on an analog or digital text recorder, where applicable also via a communication link to the memory of a computer with an automatic voice recognition system, in this "off-line" use there is no direct feedback, so that the associated training of the author is not achieved. In order, however, to be able to use an automatic voice recognition system as effectively and efficiently as possible, clear and easily comprehensible speech is as necessary as immediate recognition of instructions not belonging to the text to be transcribed, e.g. to indent a particular text part, italicize certain words or similar. Typical errors in dictation are comments such as "now we are coming to the end" (where it is not clear whether this is a text to be transcribed or merely an explanatory note) or self-corrections such as "on the left—no, right side". Such unclear expressions cause as many problems as unclear speech, background noise, interruption during dictation—for example if during dictation a person enters the room and begins to speak, or if the telephone rings—for automatic transcription using an automatic voice recognition system, so that then the text file concerned must also be manually revised or corrected and where the cost can vary greatly.

A situation very similar to the transcription of dictation occurs for example in an automatic translation service, when a text present in one language is translated into another language automatically i.e. using a translation system, whereupon the translated text is checked and if necessary manually revised or corrected. The effort of this revision should again be reflected in the account to be produced. With regard to the need for manual processing with greater or lesser effort, here it must be taken into account inter alia that in the formatting of the original text, simple sentences without the use of auxiliary clauses and the use of common expressions instead of rare terms facilitate automatic translation and thus keep the cost of processing the translated text low.

Quite generally there is thus a need for a solution in the sense that the cost incurred in the manual processing of output information produced automatically on the basis of input information, for example in a service operation, must be taken into account in an invoice i.e. when producing account information.

The object of the invention is therefore quite generally to be able to produce account information when using service facilities adapted to the work methods concerned.

In particular the object of the invention is to present a method and a device with which, instead of the average rate for the production of text, a varying tariff is possible automatically so that a favorable tariff can be charged if in transcribing a dictation or translating a text no or almost no manual text processing was required, where in contrast higher cost can be charged when there was much effort of manual processing of the transcribed or translated text. As a result, authors willing to learn and improve their method of dictation or expression can be rewarded in the form of lower invoice amounts and a stimulus can be created for authors to improve and for example use clear pronunciation during dictation and give clearly recognizable instructions.

To achieve this object the invention can be characterized according to a first aspect in the manner given below, namely:

A method of providing account information for the prior use of a service facility which processes computer software, where input information received by the service facility is processed using the computer software and thus output information is obtained which is processed manually with detection of the manual complexity applied, whereupon the account information is produced for the prior use of the service facility taking into account the detected manual complexity.

Preferably when the input information is processed using computer software, a text file is obtained as output information. Particularly preferable is the use of the computer software belonging to an automatic voice recognition system when a voice recognition method is carried out and the use of computer software for the processing of a dictation file received as input information and as a result a text file received as output information.

According to a second aspect the invention can be characterized in the following manner, namely:

A device for transcribing dictations with voice recognition means for automatic conversion of a supplied dictation file into a text file and with text processing means for manual processing of the text file and with calculating means for providing account information for the transcription performed, where detecting means are allocated to the text processing means, which detecting means are designed to detect the effort for the manual processing performed in order to produce a corrected text file and which detecting means are connected with the calculating means to provide the account information.

In the solutions according to the invention in particular an automatic detection takes place of the effort of manual processing of output information such as in particular text files which are obtained using an automatic voice recognition system or automatic translation system, where this detection of effort, as will be explained in more detail below, can take place in various ways without a special action being required by the processing person. Depending on the necessary processing effort, different calculations can take place so that on output of texts or generally output information for which practically no manual processing was required, a lower amount can be charged, where in contrast a higher tariff can be charged for extensive processing. In the assessment of an automatically obtained, processed text file, with the detecting means which are coupled for example to the text processing means, it can automatically be detected how many words have been recognized incorrectly and how many instructions, such as "new paragraph", "heading", "underline", "stop", "comma", "question mark" etc. and similar were absent in the case of a dictation, etc. The subjective understandability of dictations can also be detected by the work required for—often repeated—listening to sections of dictation, where poor understandability leads to corresponding account information, which again can have the result that dictating persons endeavor to be more precise in their production of input information i.e. during dictation to speak more precisely and give instructions so that they are then "rewarded" by corresponding account information, i.e. lower invoice amounts, and in addition the definitive output information is of ever better quality.

To detect the effort of the manual processing there are various possibilities which, depending on the required accuracy in detection, can be implemented in the sense of reflecting true cost. One particularly simple option is that in the case of a performed transcription of a dictation, the original text file, after transcribing by means of an automatic voice recognition system, can be compared with the definitive corrected text file, where the differences between the two text files constitute a measure of the processing complexity. Thus the words or word parts added and those deleted and corrected i.e. overwritten words or word parts, are used as such or as indicators for the calculation. In particular it is conceivable to set the corrected, deleted, inserted words or word parts in relation to the total number of words of the text file and via the resulting percentage obtain a value for the production of account information.

Another way of detecting the manual processing complexity in a logical manner is to detect automatically certain manual inputs performed during processing of the text file. These are usually manual inputs via keys of text processing means where usually the operation of key combinations, namely a function key and the corresponding character key, is recorded. For example a character sequence to be deleted is marked and then deleted or to insert a character a function key "Insert" is pressed, whereafter the character to be inserted is entered with the associated key. Correspondingly, if particular characters are to be replaced by others i.e. "overwritten", first using a preset function key the system changes to "overtype" mode whereafter the required characters are entered. In order now to detect the manual work necessary for text processing, said key actuations can be detected and recorded. Here in particular said function keys are constantly monitored for actuation and on actuation, with subsequent character key operation, the key operations counted. Another possibility when recording an actuation of these monitored keys is to detect the duration of the dictation listened to in parallel so that time information concerning deleted, inserted or overwritten words or word parts is obtained as a measure of the effort of manual processing and taken into account in the production of account information.

The time required to listen to parts of the dictation file can thus be combined with key operations but also be detected automatically, independently thereof. Thus for precise determination of the complexity in the case of transcribing dictations it is also suitable to establish how often a part of a dictation file must be heard—for example it may be necessary to listen to a poorly understandable word several times before understanding it—and on mere text comparison or mere detection of key actuations, the actual time required would not be taken into account. In order in addition to check the frequency of intervention or only points where checking of transcribed words by listening to the dictation is necessary to understand the subsequent text part correctly, for precise calculation it can be provided that automatic detection takes place of how many points i.e. parts of a dictation file need to be listened to when the text file is revised manually.

Preferably all the above detection possibilities lead to information approximately of the type that the "useless" parts of a dictation length are detected and also indicated suitably in the provision of account information. For example possible account information for the invoice could be of a type that "15% of dictation length was irrelevant to the text". In order to be able to pass on such account information and have evidence of the processing complexity, suitably automatic reporting of the effort of manual processing detected is provided where the individual automatic detections are stored and can then be combined into global account information as given above. If necessary, however, the details of the processing report can be read and printed out if the amount of an invoice is questioned. Thus quite generally report information is preferably generated that characterizes the effort of manual processing and such report information can be transmitted to the user of the service facility for future more efficient use of the service facility.

The invention will be further described with reference to preferred examples of embodiment shown in the drawings, to which however the invention is not restricted.

FIG. 3 shows a further flow chart to clarify the processes in detection of complexity when parts of dictations are listened to.

Figure 1:
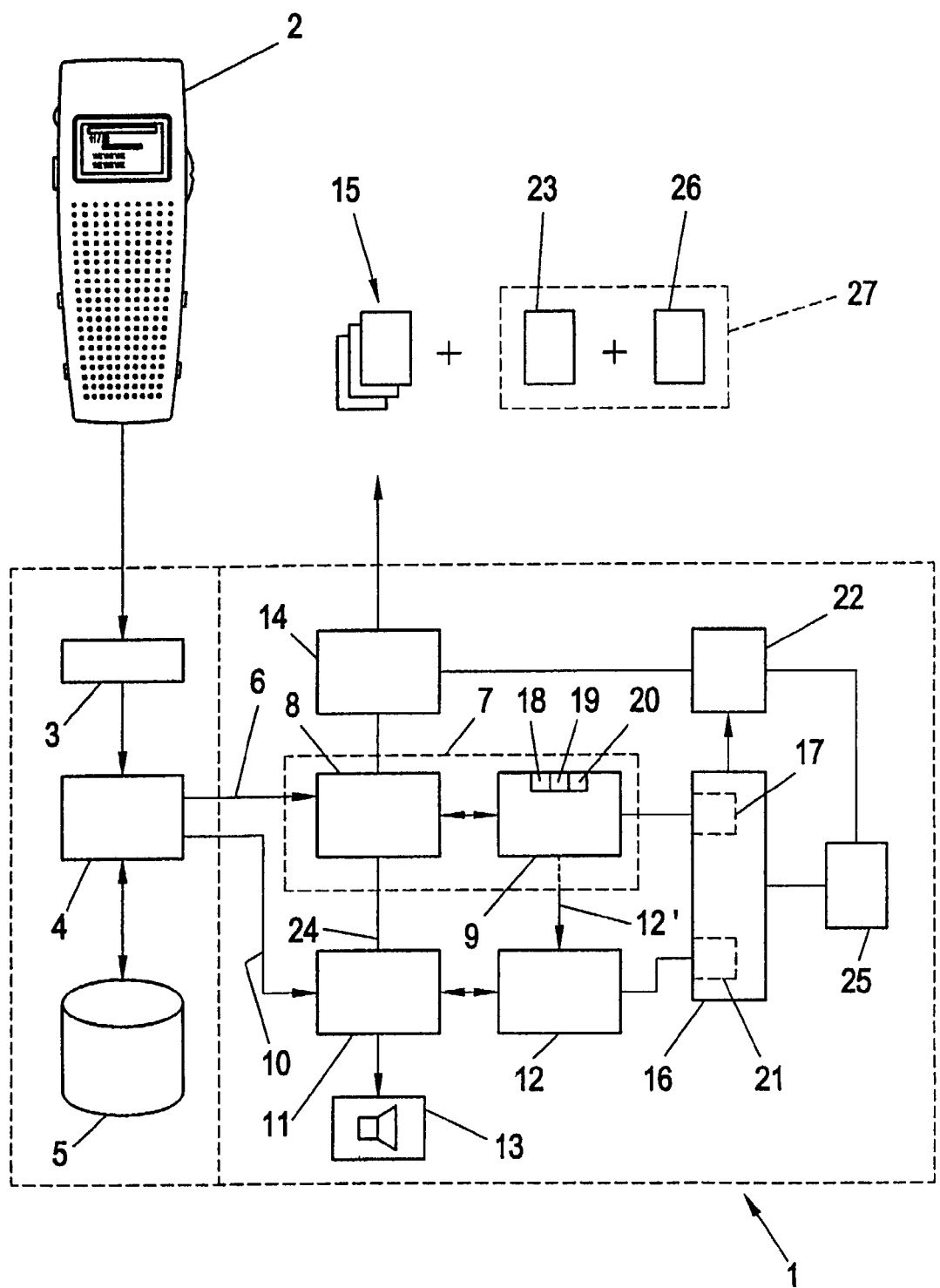
FIG. 1 shows diagrammatically in the form of a block circuit diagram a device for transcribing dictation where the effort of manual processing is detected.

FIG. 1 diagrammatically shows a device 1 for transcribing dictations, where in this case a digital dictation device 2 is provided for storing dictation material. The dictation file can be transmitted to the device 1 via a telecommunication connection, an internet connection or simply via a simple data carrier e.g. a memory card, where the device 1 has an interface 3 for supplying the dictation file in corresponding form to automatic voice recognition means 4 with associated database 5. With the voice recognition means 4 using voice recognition software, with access firstly to the voice patterns stored in the database 5 and secondly to word libraries, a text file is automatically produced by transcription. The text file is transferred via a communication line 6 to the text processing means 7 namely to a text processing unit 8 of the text processing means 7. Allocated to the text processing unit 8 is an input unit 9, namely a conventional keyboard which belongs to the text processing means 7.

In parallel to this the dictation file is supplied to an audio unit 11 via a communication line 10 to which audio unit 11 is allocated a control unit 12 to control the listening to dictation points via a speaker or headset unit 13. Inter alia control functions such as start, replay, jump back, stop, fast forward, fast rewind or similar are possible. Shown only purely diagrammatically in FIG. 1 are input means 12' which can be a foot switch, but, as is also shown for the sake of simplicity in FIG. 1, can also be a connection with a keyboard 9 to retrieve the required control functions with this keyboard 9.

Connected to the text processing unit 8 is an output unit 14, namely in this case a printer to obtain text print-outs 15. Evidently there are also other output possibilities such as for example the output of text files via corresponding interfaces and a communication line to a computer system present during dictation, where transmission using e-mail will be a frequent application.

Before a transcribed text using an automatic voice recognition system is transmitted, however, manual checking and where applicable processing is performed for which the input unit 9 and control unit 12 are provided. With the input unit 9 and control unit 12 are connected detecting means 16 designed to automatically detect the effort, in particular the duration, of manual processing of the original text file using the text processing means 7.

The detecting means 16 here contain a first detection stage 17 which is designed in particular to detect the actuation of particular keys of the input unit 9 such as actuation of a key 18 provided to delete characters and a key 19 provided to overtype characters and a key 20 provided to insert characters. Evidently monitoring of other keys for actuation is also possible for the purpose of automatic detection of processing complexity, where this monitoring and recording of key actuations is also dependent on the text processing system used. The recording of actuation of such a key 18, 19 or 20 can be achieved technically simply both by hardware but preferably by detection of a code output on operation of such a key.

The detecting means 16 also contain a second detection stage 21 which detects the complexity required for listening to a dictation file under the control of the control unit 12.

The information contained in the detection of complexity in areas 17 and 21 can but need not necessarily be combined. This information is supplied to the calculating means 22 and taken into account in the provision of account information concerning the transcription of the dictation file and processing of the text file. The account information obtained in this way is supplied to said output unit 14 for printing out an invoice 23. Instead of a print-out at least one piece of account information can be transferred electronically in file form, where then a correspondingly differently structured output unit 14 is provided.

In order to listen to the dictation file while processing the text file and consequently be able to combine sensibly the relevant information concerning the work scope established (compare areas 17 and 21 of detecting means 16), the text processing unit 8 is coupled with the audio unit 11 in a conventional manner (e.g. via processors of these units not shown in detail in the drawing, or a processor shared by the units), as is shown diagrammatically with a connection 24.

In order to have proof available of the processing cost detected or be able to inform the author concerned from whom the dictation originates, reporting means 25 are connected with the detecting means 16, where the individual processes in the manual text processing are recorded and information corresponding to the records is produced and transferred to the output unit 14 when processing the account information, i.e. in the present case on production of an invoice, in order to output a separate report 26 or, as shown diagrammatically in FIG. 1 with a block 27 shown in dotted lines, a combined account with report. In this way the author of the dictation file receives feedback on the complexity of processing the text transcribed or finally how defective his dictation was. Detailed information can also be transmitted such as for example that x% of the dictation was difficult to understand, y% of the dictation contained surplus or self-correction elements etc. Such detailed information on mistakes can inform the author of matters which may have led to a relatively high price i.e. which may have prevented a price discount.

Preferably the circumstance is utilized that in conventional transcription systems it is already provided that for each word detected, time information exists namely the start time and end time of each word in the dictation file (in the voice file).

Figure 2:
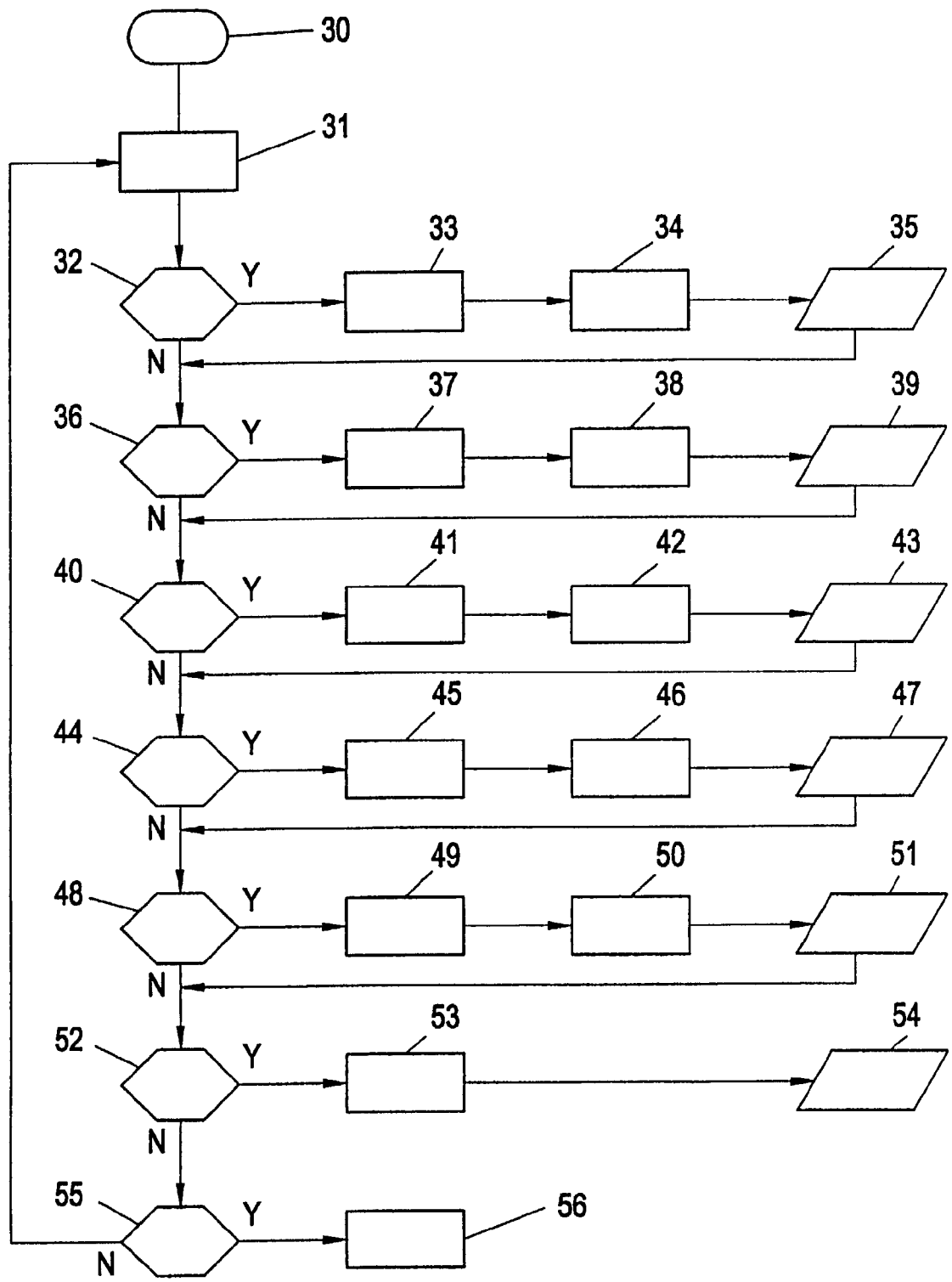
FIG. 2 shows a flow chart to clarify the detection of the manual complexity when a text file is revised.

FIG. 2 shows in a flow chart an example for processing a text file while simultaneously listening to the dictation file. After the start at block 30, at block 31 part of the dictation file is heard. At block 32 it is checked whether surplus words are present in the text file in comparison with the dictation file, and if so these surplus words are selected in a block 33 and then deleted in a block 34 by pressing the delete key 18 in FIG. 1 (or marked by pressing a marking key provided for such surplus words). In a block 35 the time duration of these surplus words is stored.

Subsequently, in block 36 it is checked whether repetitions of words or word parts are present and if so in a block 37 these words or word parts are selected and then deleted in block 38 or marked by pressing a repeat key. Then in block 39 the time duration of these repeat words is stored.

Then in a block 40 it is checked whether a correction made by the author, known as a self-correction, is contained in the dictation file. If this is the case in a block 41 the words concerned are selected and in a block 42 deleted or marked with a self-correction key. Then in a block 43 the time duration of these words is stored.

Then in a block 44 it is checked whether so-called background words are present i.e. whether in the background for example another person has spoken words, where these words have also been converted into text. If this is the case, these background words are selected in a block 45 and deleted in a block 46 or marked by pressing a background noise key, whereafter in a block 47 the time duration for these background words is stored.

Then in a block 48 it is checked whether incorrect words are present and if this is the case the incorrect words are marked with a block 49 and corrected in a block 50 where applicable by overtyping i.e. entering the correct words using the key 19 in FIG. 1. Then in block 51 the number of typed characters is recorded.

In a block 52 it is then checked whether words are missing in the text file in comparison with the dictation. If this is the case, in a block 53 the missing words (or word parts) are entered in insert mode using the key 20 in FIG. 1. Thereafter in a block 54 the number of typed characters is stored.

Then in a block 55 it is checked whether the end of the dictation file has been reached. If not, the system returns to block 31 to listen to a further part of the dictation file. If, however, the end of the dictation file is found, at the end of the procedure the system moves on to block 56.

Figure 3:
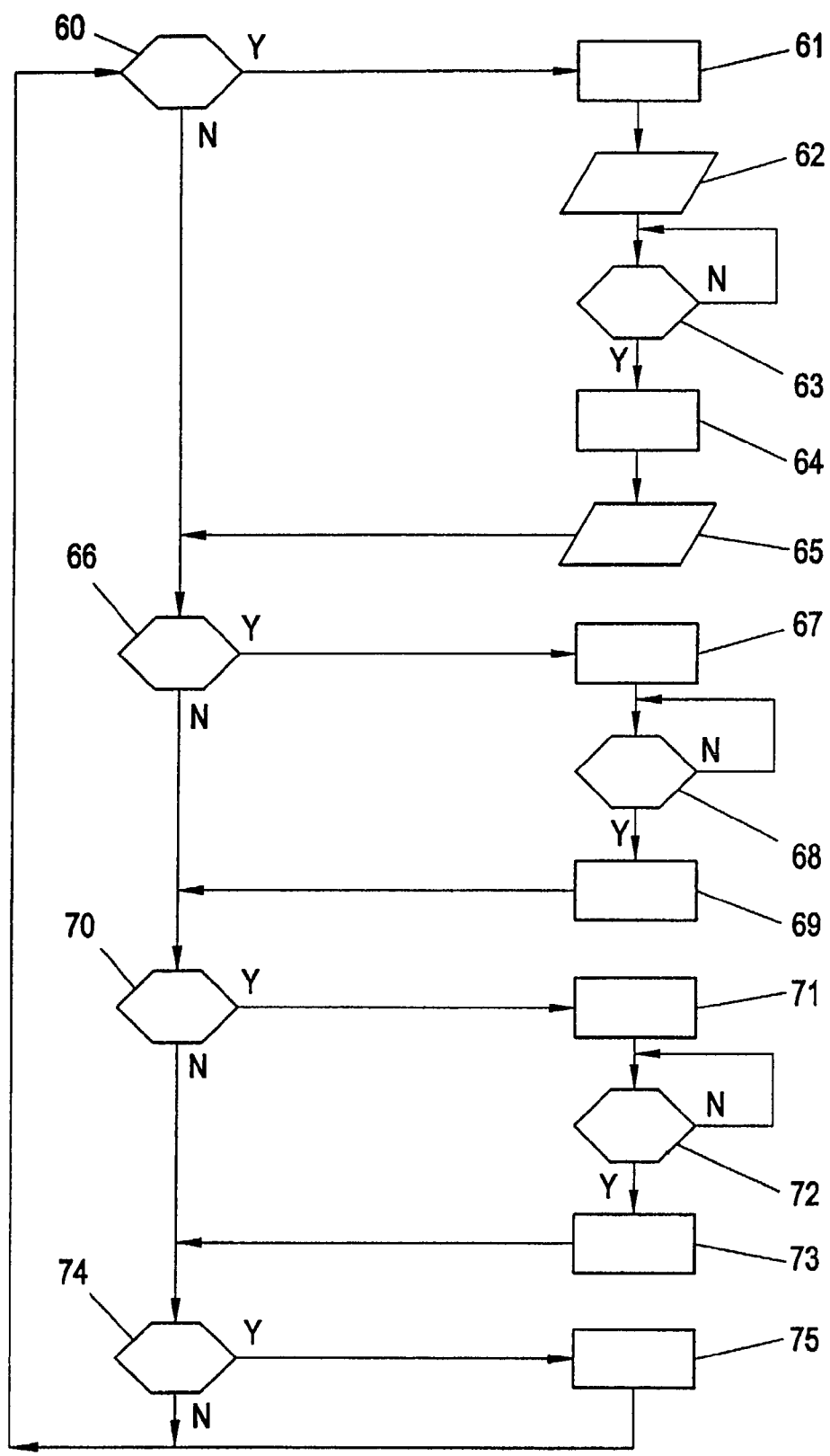

The flow chart shown in FIG. 3 diagrammatically shows the detection of the complexity in reproducing the dictation file i.e. in listening to the dictation at the same time as checking and where applicable processing the text file. In a block 60 it is checked whether the replay key is pressed. If so, in a block 61 the replay is started and the replayed word marked. In a block 62 the time of replay is then stored and in a block 63 it is checked whether the stop key was pressed. If not, in block 63 this check is repeated until it is found that the stop key was pressed, whereafter in a block 64 the replay by the audio unit 11 in FIG. 1 is stopped. The end time of the replay is then stored in a block 65.

In a flow chart shown in FIG. 3 it is also checked in a block 66 whether the rewind key was pressed. If so, in a block 67 the rewind, i.e. the fast rewind, is started, whereupon in a block 68 it is checked whether the stop key has already been pressed. If not, then this check is repeated continuously in block 68 until finally it is found that the stop key has been pressed, so that in a block 69 the rewind is stopped. (It should be mentioned here in addition that due to the detection of certain time marks for each word in the dictation file, in the known manner replaying and fast forward can take place word by word and be stopped at a particular word).

Thereafter in a block 70 it is checked whether the fast forward key was pressed. If this is the case then in a block 71 the fast forward is started and thereafter in a block 72 it is checked whether the stop key was pressed. This check is repeated until the pressing of the stop key is found, whereafter the fast forward is stopped at a block 73.

Then in a block 74 it is checked whether the position indicator was pressed. If this is the case then the position indicator is set at the position given by the position indicator, whereafter the system returns to the search in block 60, as in the case where in the check in block 74 it is found that the positioning indicator was not pressed.

In the analysis of the information detected in this manner, from the list of stored replay times it is detected which time sections have been listened to more than once. From this a proportional value can be calculated in percent from the replay repetition time and the total dictating time.

Thus for example times are detected which concern the words spoken which no longer appear in the definitive text, and where applicable with distinction by the type of words deleted:

time value of surplus words
time value of repeated words
time value of self-corrected words.

These time values are also set in relation to the total dictation time in percentage values.

Furthermore, again as a percent and in relation to the total dictation time, the time values are detected which correspond to those words that have resulted from noise or speech in the background.

Finally the number of characters entered in relation to the total number of characters in the text file is detected, on the number of those characters entered to correct incorrectly recognized text, and those characters entered to insert missing words.

The account information can be provided on the basis of a check whether the total sum of the characters entered in relation to the total text, and the total sum of the various time values—namely a) replay repeat time, b) time values caused by surplus words, c) time values caused by word repetition, d) time values due to deletion of self-correction words, and e) time values due to deletion of words from acoustic background signals—exceed predetected maximum values e.g. 25% in each case. If this is the case then for example a maximum tariff can be charged as a starting tariff which is equal to double the minimum tariff.

Alternatively, the parameters listed above (percentage of total number of characters and total time) can be compared with a minimum value e.g. in each case 5%, and if these values (number of characters, time) lie below this minimum value, the minimum tariff is charged i.e. starting from the maximum tariff a 50% discount is granted.

For cost values which lie between these two limits, intermediate values either stepped or gradually following a curve can be taken into account when account information is provided in particular in the form of percentage discounts from the maximum tariff.

Evidently it is also possible to detect the processing complexity in a different way, perhaps less precisely, and take into account the cost detected in another way such as by adding a fixed supplement to the starting tariff for each correction required. In particular in the detection of manual processing cost it is conceivable, using detecting means 16, simply to compare the original text i.e. the text file transferred from the voice recognition means 4, with the final revised text file in order, from the differences between the two text files, to draw conclusions on the necessary effort of processing. In this simple case the detection of the scope of listening to the dictation file can be omitted and the detecting means 16 according to FIG. 1 can essentially be formed as comparison means for comparing the text files, with the aid of which the differences between the text files can be detected, for example by counting the different characters, that is, both additional characters and missing characters in the definitive text in comparison with the starting text. The extent of the deviations can be detected again as a percentage of the optimum text.

The invention has been described above in relation to the transcription of dictations. For the expert, however, it is clear that comparable situations may occur in other automatic data or information production systems starting from starting data or information; one such example would be automatic translation of an input text file produced in a first language into an output text file presented in a second language, and which is then checked in a comparable manner for errors and where applicable corrected by insertion, deletion or overwriting of characters or words, where the cost necessary for this is detected accordingly.

The invention claimed is:

1. A method of providing account information for the prior use of a service facility which processes computer software, in which an input information received by the service facility is processed using the computer software and thus output information is obtained which is processed manually with detection of the manual complexity applied, whereupon the account information is produced for the prior use of the service facility taking into account the manual complexity detected, in which a text file is obtained as starting information during processing of the input information by means of computer software, in which the effort of manual processing of the text file obtained is detected automatically for the provision of account information, in which for automatic detection of the manual processing effort, the time taken for listening to parts of the dictation file is detected automatically.

2. A method as claimed in claim 1, in which the effort of manual processing of the output information is detected automatically.

3. A method as claimed in claim 1, in which a translation method is performed by means of computer software and in which a text file received as input information in a first language is processed using computer software and thus a text file is obtained as output information in a second language.

4. A method as claimed in claim 1, in which a voice recognition method is performed by means of computer software belonging to an automatic voice recognition system and in which a dictation file received as input information is processed using the computer software and thus a text file is obtained as output information.

5. A method as claimed in claim 4, in which the manual processing effort detected is recorded automatically.

6. A method as claimed in claim 1, in which the text file obtained by means of the computer software is automatically compared with the text file present after manual processing and the differences between these text files are used as a measure of the effort of manual processing.

7. A method as claimed in claim 1, in which for automatic detection of the manual processing effort preset manual inputs for processing the text file are detected automatically.

8. A method as claimed in claim 7, in which manual actuation of preset keys (18, 19, 20) of text processing means is detected automatically.

9. A method as claimed in claim 8, in which the actuation of at least one key (18) provided for deleting data in the text file is detected automatically.

10. A method as claimed in claim 8, in which the actuation of at least one key (19) provided for overwriting data in a text file is detected automatically.

11. A method as claimed in claim 8, in which the actuation of at least one key (20) provided for inserting data in a text file is detected automatically.

12. A method as claimed in claim 1, in which it is detected automatically how often a part of the dictation file is heard.

13. A method as claimed in claim 1, in which it is detected automatically how many parts of the dictation file are heard.

14. The method of claim 1, in which a correspondence is detected between actuation of particular keys and said time detected.

* * * * *